(12) United States Patent
Nam et al.

(10) Patent No.: US 7,426,273 B2
(45) Date of Patent: Sep. 16, 2008

(54) AUDIO/VIDEO STREAM PROCESSING SYSTEM AND METHOD FOR DATA COPY PROTECTION

(75) Inventors: Su-hyun Nam, Seoul (KR); Yun-sang Kim, Suwon-si (KR); Yang-lim Choi, Seongnam-si (KR)

(73) Assignee: Samsung Electronics Co. Ltd., Suwon-si (KR)

( * ) Notice: Subject to any disclaimer, the term of this patent is extended or adjusted under 35 U.S.C. 154(b) by 827 days.

(21) Appl. No.: 10/809,447

(22) Filed: Mar. 26, 2004

(65) Prior Publication Data

US 2004/0247288 A1  Dec. 9, 2004

Related U.S. Application Data

(60) Provisional application No. 60/486,916, filed on Jul. 15, 2003.

(30) Foreign Application Priority Data

| Jun. 4, 2003 | (KR) | .................. | 10-2003-0036004 |
| Aug. 27, 2003 | (KR) | .................. | 10-2003-0059603 |

(51) Int. Cl.
*H04N 7/167* (2006.01)
*H04L 9/00* (2006.01)
(52) U.S. Cl. ........................ 380/203; 726/30
(58) Field of Classification Search ............... 380/203
See application file for complete search history.

(56) References Cited

U.S. PATENT DOCUMENTS

| 4,118,789 | A | * | 10/1978 | Casto et al. | ................... | 700/79 |
| 4,593,353 | A | * | 6/1986 | Pickholtz | ................... | 705/55 |
| 4,796,220 | A | * | 1/1989 | Wolfe | ................... | 705/56 |
| 6,223,285 | B1 | | 4/2001 | Komuro et al. | | |
| 6,434,322 | B1 | * | 8/2002 | Kimura et al. | ................. | 386/94 |
| 6,539,468 | B1 | * | 3/2003 | Inoue et al. | ................... | 712/36 |
| 6,643,085 | B2 | * | 11/2003 | Shirai et al. | ................... | 360/60 |
| 6,785,815 | B1 | * | 8/2004 | Serret-Avila et al. | ......... | 713/176 |
| 6,912,513 | B1 | * | 6/2005 | Candelore | ................... | 705/51 |
| 7,031,942 | B2 | * | 4/2006 | Ogino et al. | .................. | 705/51 |
| 7,051,211 | B1 | * | 5/2006 | Matyas et al. | ................ | 713/187 |
| 7,227,953 | B2 | * | 6/2007 | Shida | .......................... | 380/203 |
| 2001/0017828 | A1 | * | 8/2001 | Yamada | .................... | 369/47.12 |
| 2002/0041686 | A1 | | 4/2002 | Moriyama et al. | | |
| 2002/0071648 | A1 | * | 6/2002 | Matsumura et al. | ............ | 386/1 |

(Continued)

FOREIGN PATENT DOCUMENTS

CN   1228579 A   9/1999

(Continued)

OTHER PUBLICATIONS

International Search Report.

(Continued)

*Primary Examiner*—Matthew Heneghan
(74) *Attorney, Agent, or Firm*—Sughrue Mion, PLLC

(57) ABSTRACT

An AV stream processing system includes an AV stream input unit which receives an AV stream having an AV content information field including first copy control information, and an AV content field including second copy control information, a determination unit which extracts the first and second copy control information from the received AV stream and determines whether the first copy control information has been modified, and an AV stream decryption unit which processes the received AV stream according to predetermined criteria, when the first copy control information has been modified.

14 Claims, 7 Drawing Sheets

U.S. PATENT DOCUMENTS

| | | |
|---|---|---|
| 2002/0114459 A1 | 8/2002 | Belenko et al. |
| 2002/0156742 A1 | 10/2002 | Ogino et al. |
| 2003/0101140 A1 | 5/2003 | So et al. |

FOREIGN PATENT DOCUMENTS

| | | |
|---|---|---|
| EP | 0 924 930 A2 | 6/1999 |
| EP | 0 938 091 A2 | 8/1999 |
| EP | 0 959 467 A2 | 11/1999 |
| EP | 1 005 040 A1 | 5/2000 |
| EP | 1 054 314 A2 | 11/2000 |
| EP | 1 126 453 A2 | 8/2001 |
| EP | 1 202 271 A2 | 5/2002 |
| JP | 11353795 A | 12/1999 |
| JP | 2002-073396 A | 3/2002 |
| WO | WO98/02881 A1 | 1/1998 |

OTHER PUBLICATIONS

The First Office Action for Application No. 200410068404.0 in the Patent Office of the People's Republic of China of Jan. 19, 2007.

* cited by examiner

AUDIO/VIDEO STREAM PROCESSING SYSTEM AND METHOD FOR DATA COPY PROTECTION

CROSS-REFERENCE TO RELATED APPLICATION

This application claims the priority of Korean Patent Application Nos. 10-2003-0036004 and 10-2003-0059603, filed on Jun. 4, 2003, and Aug. 27, 2003, respectively, in the Korean Intellectual Property Office, and U.S. Provisional Patent Application No. 60/486,916, filed on Jul. 15, 2003, in the United States Patent and Trademark Office, the disclosures of which are incorporated herein by reference.

BACKGROUND OF THE INVENTION

1. Field of the Invention

Systems, apparatuses, and methods consistent with the present invention relate to protecting data, and more particularly, to protecting against unauthorized copying of audio/video (AV) contents by using copy control information (CCI) included in an AV stream.

2. Description of the Related Art

Generally, an AV stream includes content and copy control information indicating the status of a copy control of the content. That is, the copy control information indicates whether an AV stream processing system, for example, a recorder implemented by hardware or software, has an authorization to copy the content included in the AV stream received from a transmitting medium. The recorder, for example, decrypts the content based on a value of the copy control information.

The copy control information may be indicated with bits, as predetermined within the AV stream, for example, with a 2-bit code. Four types of modes capable of constituting the copy control information are listed in Table 1 as follows.

TABLE 1

Operation modes of an AV apparatus according to CCI information

| CCI code and status of AV stream | Description of operation |
| --- | --- |
| 00 'copy free' | Contents are not encrypted, copying thereof is unrestricted |
| 01 'copy free but encrypted' | Contents are encrypted but copying thereof is unrestricted |
| 10 'copy one generation' | Contents are encrypted, and only one copying thereof is allowed. After the one copying, CCI information is changed to 'no more copy' |
| 11 'no more copy or copy never' | Contents are encrypted, and no copying thereof is allowed |

FIG. 1 illustrates a schematic structure of an AV stream 100. The AV stream 100 comprises a content field which includes contents and an information field which includes information on the contents. The information field comprises a region 110 for copy control information, which is used to control a copying operation of an AV apparatus, and information on a variety of contents contained in the AV stream 100. The content field is divided into n sub-unit regions, that is, 'Content_unit_1,' 'Content_unit_2,' ... 'Content_unit_n.'

The region 110 included in the information field for copy control information ("first copy control information") is divided into regions corresponding to the number of the sub-units. Each of the divided regions comprises a copy control information value, such as 00, 01, 10 and 11, and location information of a corresponding one of the sub-units. The location information may comprise physical or logical addresses for the corresponding sub-unit, or time information relating to when the content in the sub-unit is played. FIG. 1 refers to the location information as 'unit_1_ptr,' 'unit_2_ptr,' ... 'unitn_ptr.'

A sub-unit may be divided into one or more regions. By way of example, a sub-unit included in the content field, that is, 'Content_unit_2' may be divided into three small regions of 'Sub_2_1,' 'Sub_2_2' and 'Sub_2_3,' and each of the small regions may include a corresponding copy control information 130 thereto.

The copy control information included in each sub-unit of the content field ("second copy control information") is used to generate a decryption key to decrypt the content, and thus, if it is modified, the contents cannot be decrypted. For example, the copy control information 130 of Sub_2_1 is used to generate a decryption key to decrypt the content of Sub_2_1. However, the first copy control information 110 is used to control a copying operation, and thus, an unauthorized copying of the contents becomes possible as a third party may change the first copy control information 110.

FIG. 2 shows a conventional AV stream data copy protection system to protect contents from being copied without authorization from an owner of the contents. The AV stream data copy protection system 200, which decrypts encrypted AV stream data, comprises an AV stream receiving unit 210, a control unit 220, a decryption key generating unit 230, and a content interpreting unit 240. The AV stream receiving unit 210 receives AV stream data. The control unit 220 receives a control signal to control an operation of an AV apparatus, input from the outside. The control signal may comprise a command signal to play the content or a command signal to copy the content. Referring to FIG. 1, the control unit 220 receives the first copy control information 110 transmitted from the AV stream receiving unit 210, and transmits a control signal corresponding to a value of the first copy control information 110 to the decryption generating unit 230 and the content interpreting unit 240.

In detail, the AV stream receiving unit 210 receives AV stream data, and transmits to the control unit 220 the first copy control information 110 included in the AV stream data. The control unit 220 receives a control signal to control an operation of an AV apparatus from the outside. When the control signal is a command signal to copy content, the control unit 220 checks an encryption status of AV contents in the AV stream data received by the AV stream receiving unit 210, by referring to the first copy control information 110.

When a value of the first copy control information 110 is 'copy free,' there is no need to generate a decryption key, and thus, the control unit 220 allows the content interpreting unit 240 to transmit the AV stream data to an output device 250 as received by the AV stream receiving unit 210. When the value of the first copy control information 110 is 'no more copy or copy never,' 'copy free but encrypted,' or 'copy one generation,' data is required to be decrypted. Accordingly, the decryption key generating unit 230 receives the first copy control information 110 from the control unit 220, generates a decryption key by using the second copy control information 130 and other information from the AV stream receiving unit 210, and transmits the decryption key to the content interpreting unit 240. The content interpreting unit 240 decrypts a content field of the AV stream data received by the AV stream receiving unit 210, by using the decryption key, and transmits decrypted AV content to an output device 250, such as a storage medium or a displaying apparatus.

The conventional AV stream data copy protection system 200 uses the first copy control information 110 to check whether an AV apparatus has an authorization to copy the contents. However, the first copy control information 110 may be easily modified to facilitate unauthorized copying of the contents. Therefore, for example, when 'no more copy or copy never' (11) or 'copy one generation' (10) is modified to 'copy free but encrypted' (01), or when 'no more copy or copy never' (11) is modified to 'copy one generation' (10), and such modified information is received by the AV stream receiving unit 210 of the conventional AV stream data copy protection system 200, the control unit 220 may falsely confirm that copying of an AV stream has been allowed. Accordingly, unauthorized copying of the contents may be accomplished.

SUMMARY OF THE INVENTION

Accordingly, it is an aspect of the present invention to provide an AV stream data processing system which prevents unauthorized processing of contents through, for example, modification of copy control information.

Another aspect of the present invention is to provide a method of protecting contents, including determining whether copy control information has been modified and appropriately responding to the modification.

Additional aspects and/or advantages of the present invention will be set forth in part in the description which follows and, in part, will be obvious from the description, or may be learned by practice of the invention.

To achieve the above and/or other aspects of the present invention, there is provided an audio/video (AV) stream processing system comprising a receiving unit which receives an AV stream comprising a content information field and a content field, wherein the content information field comprises first copy control information, and the content field comprises second copy control information, a determination unit which determines whether the first and second copy control information are different, and a decryption unit for processing the AV stream.

The determination unit may determine whether copy control mode information of the first and second copy control information are different.

The decryption unit may stop decrypting content of the AV stream when the first and second copy control information are different.

The decryption unit may stop generating a decryption key for decrypting content of the AV stream when the first and second copy control information are different.

The decryption unit may process content of the AV stream according to one of the first and second copy control information having a higher priority over the other, when the first and second copy control information are different. The determining unit may establish priority between the first and second copy control information. The second copy control information may have priority over the first copy control information when the first and second copy control information are different. The first copy control information may have priority over the second copy control information when the first and second copy control information are different. The one of the first and second copy control information may have higher priority over the other when the one provides enhanced copy control protection over the other.

Each of the first and second copy control information may comprise a copy control mode of content of the AV stream, and the copy control mode may comprise a first mode in which the content is encrypted and copying thereof is absolutely prohibited, a second mode in which the content is encrypted and one time copying thereof is allowed, wherein the second mode being changed to the first mode after the one time copying, a third mode in which the content is encrypted and unrestricted or unlimited copying thereof is allowed, and a fourth mode in which the content is not encrypted and unrestricted or unlimited copying thereof is allowed.

The decryption unit may comprise a key generating unit which generates a decryption key for decrypting the content, a content interpreting unit which decrypts the content using the decryption key, and a control unit which controls the key generating unit and the content interpreting unit to stop generating the decryption key or stop decrypting the content when the first and second copy control information are different, and when the first and second copy control information are the same, controls the key generating unit and the content interpreting unit according to the copy control mode. When the first and second copy control information are different, or the copy control mode corresponds to the first mode, generating of the decryption key or decrypting of the content may be stopped to prevent unauthorized copying of the content. The key generating unit may generate the decryption key using information comprising the second copy control information. The control unit may control the key generating unit to generate the decryption key to decrypt the content in response to the copy control mode being one of the second and third mode, and control the content interpreting unit to output the content, as is, in response to the copy control mode being the fourth mode.

The system may further comprise a storage unit which stores the decrypted content or the as is content.

The system may further comprise a displaying unit which displays the decrypted content or the as is content.

The determining unit may comprise a storage unit which stores the first copy control information, and a comparator unit which compares the copy control mode of the first copy control information with that of the second copy control information.

The decryption unit may comprise a control unit which outputs a signal corresponding to the copy control mode when the first and second copy control information are the same, and generates a stop signal when the first and second copy control information are different or the signal corresponds to the first mode, wherein the control unit outputs the stop signal to the key generating unit when the AV stream is not being played and outputs the stop signal to the content interpreting unit when the AV stream is being played, a key generating unit which generates a decryption key for decrypting the content in response to the signal corresponding to one of the second and third mode, and stops generating the decryption key in response to the stop signal, and a content interpreting unit which decrypts the content using the decryption key, outputs the content, as is, in response to the signal corresponding to the fourth mode, and stops decrypting the content in response to the stop signal.

The decryption unit may stop processing the AV content when the first and second copy control information are different.

The decryption unit may process the AV stream using one of the first and second copy control information providing enhanced copy protection over the other, when the first and second copy control information are different.

To achieve the above and/or other aspects of the present invention, there is provided another audio/video (AV) stream processing system comprising means for receiving an AV stream comprising a content information field and a content field, means for processing the AV stream, and means for determining whether copy control information of the content information field has been modified.

The processing means may stop processing the AV stream when the copy control information has been modified. The processing means may process the AV stream using one of the copy control information of the content information field and copy control information of the content field having a higher priority over the other, when the copy control information of the content information field has been modified.

To achieve the above and/or other aspects of the present invention, there is provided still another audio/video (AV) stream processing system comprising means for receiving an AV stream comprising a content information field and a content field, wherein the content information field comprises first copy control information, and the content field comprises second copy control information, means for processing the AV stream, and means for determining whether the first and second copy control information are different.

To achieve the above and/or other aspects of the present invention, there is provided yet another audio/video (AV) stream processing system comprising a receiving unit which receives an AV stream comprising a content information field and a content field, wherein the content information field comprises first copy control information, and the content field comprises second copy control information, a determination unit which compares the first copy control information with the second copy control information, and a decryption unit which stops processing the AV stream or processes the AV stream using one of the first and second copy control information having a higher priority over the other, when the first and second copy control information are different.

To achieve the above and/or other aspects of the present invention, there is provided still yet another audio/video (AV) stream processing system comprising a receiving unit which receives an AV stream comprising a content information field and a content field, wherein the content information field comprises first copy control information, and the content field comprises second copy control information, a determination unit which determines whether the first copy control information has been modified when compared to the second copy control information, and a decryption unit for processing the AV stream.

To achieve the above and/or other aspects of the present invention, there is provided an apparatus for copy control for use in an audio/video (AV) stream processing system which processes an AV stream comprising a content information field and a content field, the apparatus comprising an extracting component which extracts copy control information of the content information field and copy control information of the content field from the AV stream, and a determining component which determines whether the copy control information of the content information field and the copy control information of the content field are different.

The determining component may determine whether copy control mode information, corresponding to the content of the AV stream, of the first and second copy control information are different so as to prevent unauthorized processing of the AV stream.

To achieve the above and/or other aspects of the present invention, there is provided another apparatus for copy control for use in an audio/video (AV) stream processing system which processes an AV stream, the apparatus comprising an extracting component which extracts copy control information from a content information field of the AV stream, and a determining component which determines whether the copy control information has been modified.

The determining component may determine whether the copy control information of the content information field has been modified when compared to copy control information of a content field of the AV stream, so as to prevent unauthorized processing of the AV stream.

To achieve the above and/or other aspects of the present invention, there is provided still another apparatus for copy control for use in an audio/video (AV) stream processing system which processes an AV stream comprising a content information field and a content field, the apparatus comprising an extracting component which extracts copy control information of the content information field and copy control information of the content field from the AV stream, and a comparing component which compares the copy control information of the content information field and the copy control information of the content field to determine whether the copy control information of the content information field and the copy control information of the content field are different.

To achieve the above and/or other aspects of the present invention, there is provided yet another apparatus for copy control for use in an audio/video (AV) stream processing system which processes an AV stream comprising a content information field and a content field, the apparatus comprising an extracting component which extracts copy control information of the content information field and copy control information of the content field from the AV stream, and a determining component which establishes priority between the copy control information of the content information field and the copy control information of the content field, when the copy control information of the content information field and the copy control information of the content field are different.

The determining component may establish one of the copy control information of the content information field and the copy control information of the content field providing enhanced copy protection over the other as information for processing the AV stream, when the copy control information of the content information field and the copy control information of the content field are different. The determining component may establish the copy control information of the content information field as information for processing the AV stream, when the copy control information of the content information field and the copy control information of the content field are different. The determining component may establish the copy control information of the content field as information for processing the AV stream, when the copy control information of the content information field and the copy control information of the content field are different.

To achieve the above and/or other aspects of the present invention, there is provided an AV stream processing method comprising receiving an AV stream comprising a content information field and a content field, wherein the content information field comprises first copy control information, and the content field comprises second copy control information, determining whether the first and second copy control information are different, and processing the AV stream based on the determination.

The determining of whether the first and second copy control information are different may comprise determining whether copy control mode information of the first and second copy control information are different. The processing of the AV stream may comprise processing the AV stream according to the copy control mode information when the first and second copy control information are the same.

The processing of the AV stream may comprise terminating decrypting of content of the AV stream when the first and second copy control information are different.

The processing of the AV stream may comprise terminating generating of a decryption key for decrypting content of the AV stream when the first and second copy control information are different.

The processing of the AV stream may comprise processing content of the AV stream using one of the first and second copy control information providing enhanced copy protection over the other, when the first and second copy control information are different.

When the first and second copy control information are different, the processing of the AV stream may comprise one of terminating processing of the AV stream, and processing the AV stream using one of the first and second copy control information having a higher priority over the other. When the first and second copy control information are different, the processing of the AV stream may comprise processing content of the AV stream using the second copy control information. When the first and second copy control information are different, the processing of the AV stream may comprise processing content of the AV stream using the first copy control information.

When the first and second copy control information are different, the processing of the AV stream may comprise terminating decrypting of content of the AV stream when the AV stream is being played, or terminating generating of a decryption key for decrypting content of the AV stream when the AV stream is not being played.

The method may further comprise displaying a message indicating that processing of the AV stream is prohibited. The method may further comprise establishing the second copy control information as having priority over the first copy control information when the first and second copy control information are different, wherein the processing of the AV stream comprises processing content of the AV stream using the second copy control information. The method may further comprise establishing the first copy control information as having priority over the second copy control information when the first and second copy control information are different, wherein the processing of the AV stream comprises processing content of the AV stream using the first copy control information.

To achieve the above and/or other aspects of the present invention, there is provided another AV stream processing method comprising receiving an AV stream comprising a content information field and a content field, determining whether copy control information of the content information field has been modified, and processing the AV stream based on the determination.

The processing of the AV stream may comprise terminating processing of the AV stream when the copy control information has been modified.

The processing of the AV stream may comprise processing the AV stream using one of the copy control information of the content information field and copy control information of the content field having a higher priority over the other, when the copy control information of the content information field has been modified.

To achieve the above and/or other aspects of the present invention, there is provided still another AV stream processing method comprising receiving an AV stream comprising a content information field and a content field, wherein the content information field comprises first copy control information, and the content field comprises second copy control information, determining whether the first and second copy control information are different so as to prevent unauthorized processing of the AV stream, and processing the AV stream based on the determination.

To achieve the above and/or other aspects of the present invention, there is provided yet another AV stream processing method comprising receiving an AV stream comprising a content information field and a content field, wherein the content information field comprises first copy control information, and the content field comprises second copy control information, comparing the first copy control information with the second copy control information, and when the first and second copy control information are different, performing one of terminating processing of the AV stream and processing the AV stream using one of the first and second copy control information having a higher priority over the other.

To achieve the above and/or other aspects of the present invention, there is provided still yet another AV stream processing method comprising receiving an AV stream comprising a content information field and a content field, wherein the content information field comprises first copy control information, and the content field comprises second copy control information, determining whether the first copy control information has been modified when compared to the second copy control information, and processing the AV stream based on the determination.

To achieve the above and/or other aspects of the present invention, there is provided a method for copy control in processing an audio/video (AV) stream comprising a content information field and a content field, the method comprising extracting copy control information of the content information field and copy control information of the content field from the AV stream, and determining whether the copy control information of the content information field and the copy control information of the content field are different.

The determining may comprise determining whether copy control mode information, corresponding to the content of the AV stream, of the first and second copy control information are different so as to prevent unauthorized processing of the AV stream.

To achieve the above and/or other aspects of the present invention, there is provided another method for copy control in processing an audio/video (AV) stream, the method comprising extracting copy control information from a content information field of the AV stream, and determining whether the control information has been modified.

The determining may comprise determining whether the copy control information of the content information field has been modified when compared to copy control information of a content field of the AV stream, so as to prevent unauthorized processing of the AV stream.

To achieve the above and/or other aspects of the present invention, there is provided still another method for copy control in processing an audio/video (AV) stream comprising a content information field and a content field, the method comprising extracting copy control information of the content information field and copy control information of the content field from the AV stream, and comparing the copy control information of the content information field and the copy control information of the content field to determine whether the copy control information of the content information field and the copy control information of the content field are different.

To achieve the above and/or other aspects of the present invention, there is provided yet another method for copy control in processing an audio/video (AV) stream comprising a content information field and a content field, the method comprising comparing copy control information of the content information field with copy control information of the content field, and establishing priority between the copy control information of the content information field and the copy control information of the content field, when the copy control information of the content information field and the copy control information of the content field are different.

The establishing may comprise establishing one of the copy control information of the content information field and the copy control information of the content field providing enhanced copy protection over the other, as information for processing the AV stream when the copy control information of the content information field and the copy control information of the content field are different. The establishing may comprise establishing the copy control information of the content information field as information for processing the AV stream, when the copy control information of the content information field and the copy control information of the content field are different. The establishing may comprise establishing the copy control information of the content field as information for processing the AV stream, when the copy control information of the content information field and the copy control information of the content field are different.

BRIEF DESCRIPTION OF THE DRAWINGS

These and/or other aspects and advantages of the invention will become apparent and more readily appreciated from the following description of the aspects of the present invention, taken in conjunction with the accompanying drawings of which.

DETAILED DESCRIPTION OF THE INVENTION

Figure 1:
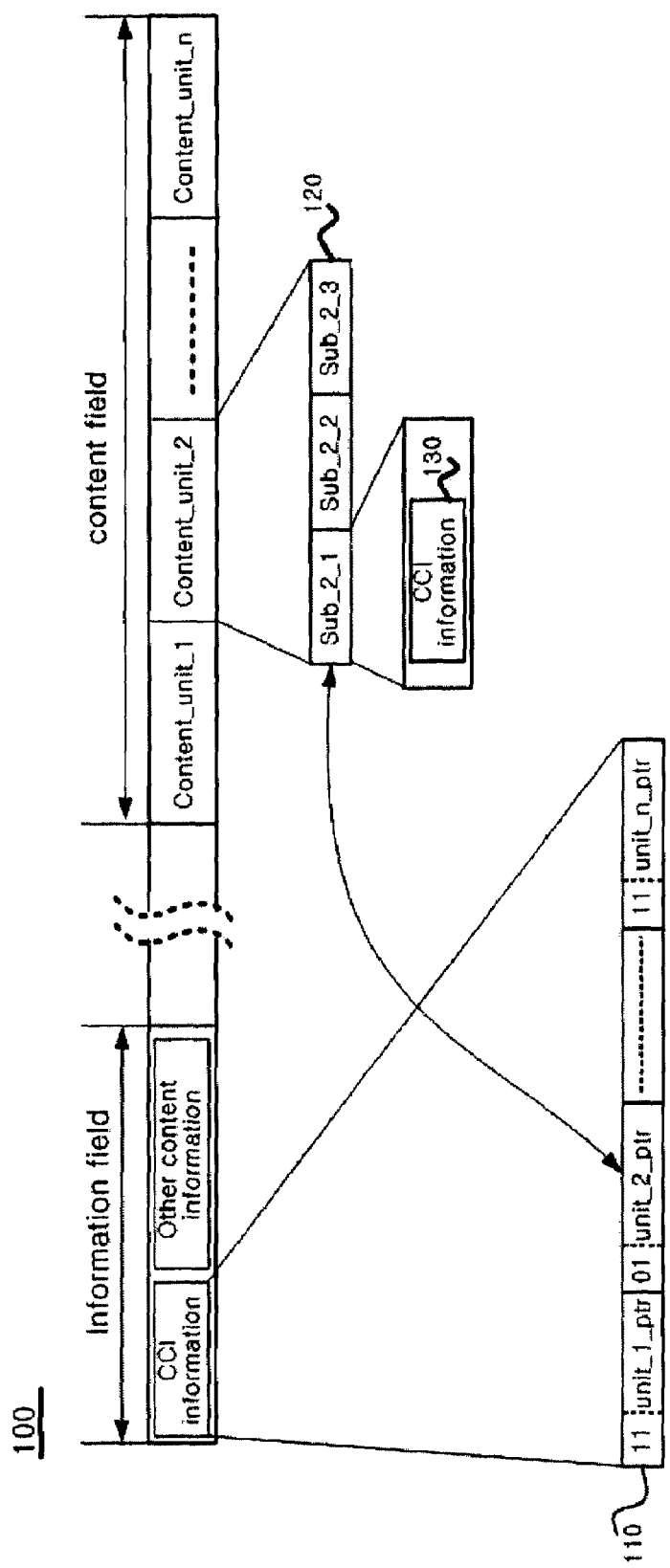
FIG. 1 is a schematic diagram illustrating a configuration of an AV stream.
Figure 2:
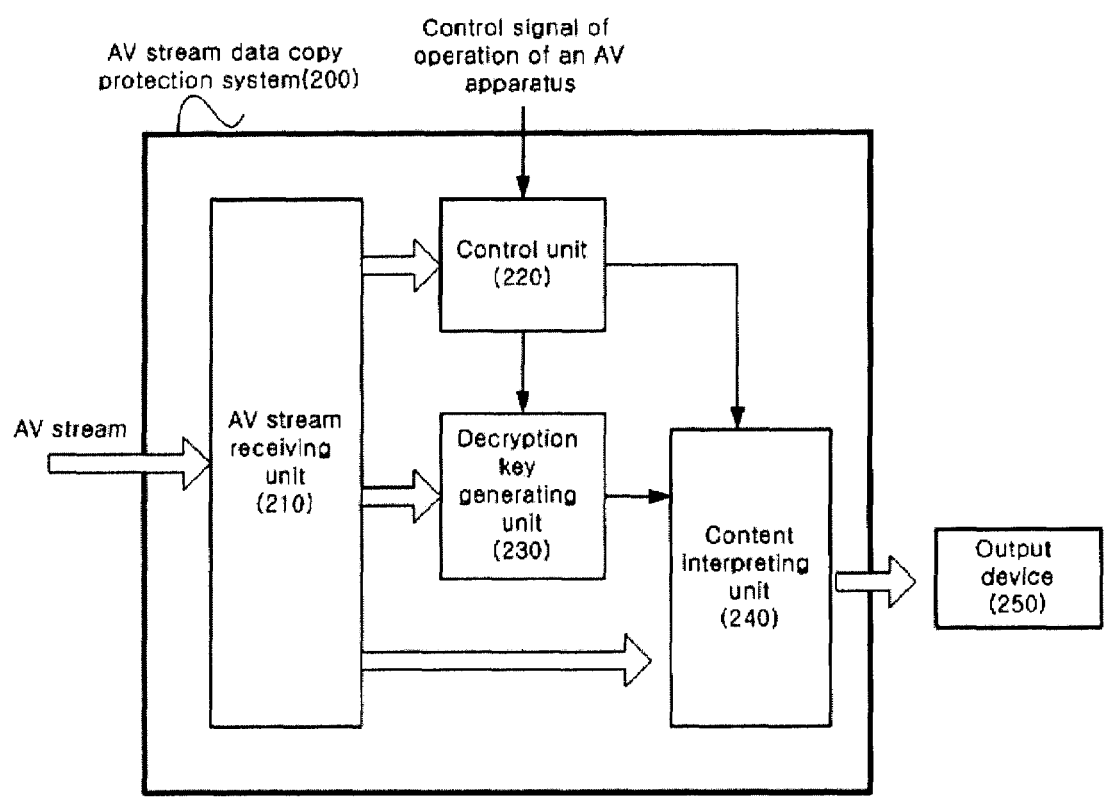
FIG. 2 is a block diagram illustrating a configuration of a conventional AV stream processing system.

Reference will now be made in detail to the embodiments of the present invention, examples of which are illustrated in the accompanying drawings, wherein like reference numerals refer to like elements throughout. The embodiments are described below in order to explain the present invention by referring to the figures. And, for easy description, while embodiments of the present invention will be herein described with reference to four types of copy control information statuses and 2-bit copy control information codes corresponding to the respective copy control information states indicated in Table 1, it is understood that the present invention is not limited thereto. The copy control information statuses according to an exemplary embodiment of the present invention may comprise a part of the indicated four types or more than the four types. The copy control information codes are also not limited to the 2-bit information and may be represented in any form which can indicate the copy control information status. And additionally, the second copy control information may refer to the copy control information 130 included in each of the sub units included in the content field shown in FIG. 1, or otherwise refer to the copy control information to represent each of the sub units.

Figure 3:
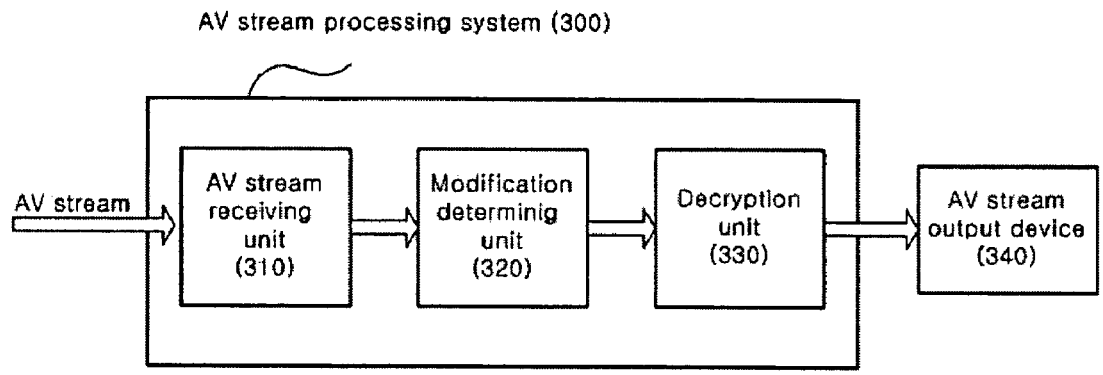
FIG. 3 is a block diagram illustrating an AV stream processing system for data copy protection according to an embodiment of the present invention.

FIG. 3 shows an AV stream processing system for data copy protection according to an embodiment of the present invention. The AV stream processing system 300 comprises an AV stream receiving unit 310, a modification determining unit 320 and a decryption unit 330. The AV stream receiving unit 310 receives an AV stream and transmits the received AV stream to the modification determining unit 320. Referring to FIGS. 1 and 3, the modification determining unit 320 compares first and second copy control information included in the AV stream. When it is determined that a value of the first copy control information is different than that of the second copy control information, the AV stream processing system 300 determines whether to decrypt the AV stream according to predetermined criteria.

When it is determined that a value of the first copy control information is identical to a value of the second copy control information, the decryption unit 330 conducts a decryption operation corresponding to the value of the copy control information. At this time, there is no need to decrypt the AV stream when a value of the copy control information corresponds to 'copy free,' and thus, the decryption unit 330 transmits the AV stream (as received by the AV stream receiving unit 310) to, for example, an AV stream output device 340. When the value of the copy control information corresponds to 'no more copy or copy never,' 'copy free but encrypted, or 'copy one generation,' the decryption unit 330 generates a decryption key by using the second copy control information from the modification determining unit 320 and other information, decrypts AV content of the AV stream with the decryption key, and transmits the decrypted AV content to, for example, the AV stream output device 340. The other information used to generate the decryption key may comprise at least one of a seed value randomly generated to generate the decryption key, a value of common key or secret key inherent within an AV apparatus, and a value of common key or secret key corresponding to the storage media for AV content. According to various aspects, the AV stream output device 340 may comprise an electrical or an optical recording medium, a storage medium on which the AV stream as read may be recorded, or a displaying apparatus on which the AV stream as read may be displayed. According to other aspects, the decryption unit 330 may transmit the decrypted AV content through a wire or a wireless transmission medium, in lieu of the output device 340 above.

Figure 4:
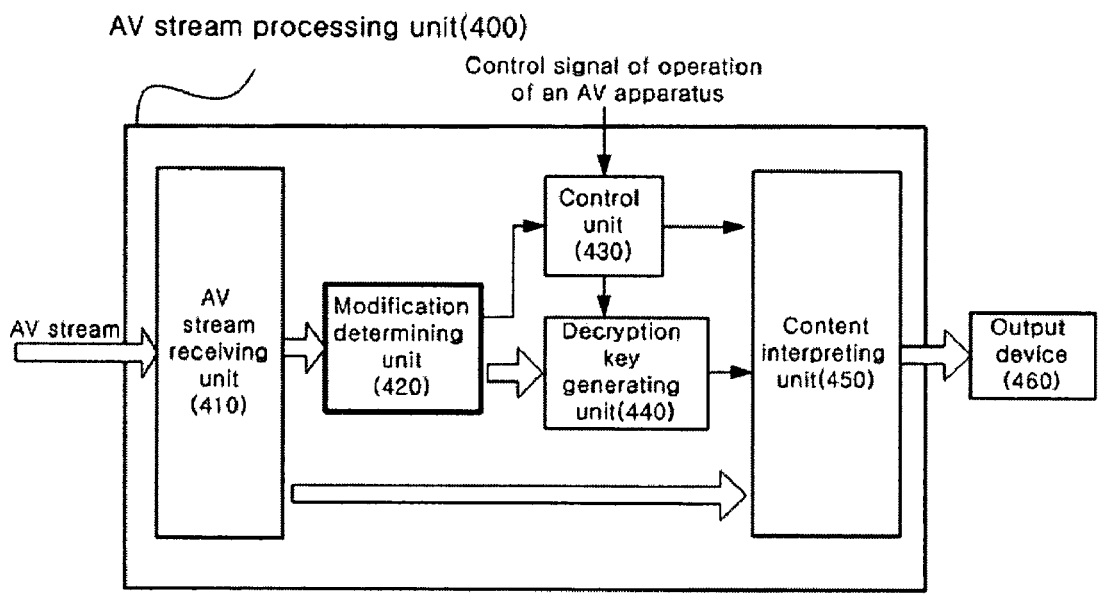
FIG. 4 is a block diagram illustrating an AV stream processing system for data copy protection according to another embodiment of the present invention.

FIG. 4 shows an AV stream processing system for data copy protection according to another embodiment of the present invention. The AV stream processing unit 400 comprises an AV stream receiving unit 410 which receives an AV stream, a modification determining unit 420 which determines whether copy control information included in the AV stream has been modified, and a control unit 430 which determines whether to decrypt the AV stream according to the determination result of the modification determining unit 420 and transmits a command signal for decryption, corresponding to a value of the copy control information, to a decryption key generating unit 440. The AV stream processing unit 400 further comprises the decryption key generating unit 440 which receives a decryption command from the control unit 430 and generates a decryption key by using second copy control information received from the modification determining unit 420 and other information used to generate the decryption key, and a content interpreting unit 450 which decrypts AV content of the AV stream by using the decryption key transmitted form the decryption key generating unit 440 and transmits the decrypted AV content to one output device 460 of a variety of output devices described above, known in the art.

By way of an example, an operation of the AV stream processing unit 400 is as follows. The AV stream receiving unit 410 receives an AV stream, transmits the AV stream to the modification determining unit 420, and transmits contents of the AV stream to the content interpreting unit 450. At this time, the control unit 430 receives a control signal to control an operation of an AV apparatus from the outside. For example, the control signal may be a signal to allow the AV apparatus to play the contents of the AV stream, or a signal to allow the AV apparatus to copy the contents to a predetermined storage space.

The modification determining unit 420 extracts first and second copy control information of the AV stream to determine whether they have the same value. When the first and second copy control information are not identical, the modification determining unit 420 determines that the first copy control information has been modified and transmits a signal to the control unit 430 indicating that the copy control information has been modified. In response, the control unit 430 transmits a command signal to the content interpreting unit 450 to stop decrypting the contents, thereby preventing unauthorized copying of the contents. At this time, the control unit 430 transmits a command signal to the decryption key generating unit 440 to stop generating the decryption key, thereby preventing the decryption key itself from being generated.

According to other aspects, when the first and second copy control information are different, or when it is determined that one of the first and second copy control information has been modified, the modification determining unit 420 may establish a priority between the first and second copy control information. In this case, the control unit 430 determines whether to decrypt the AV stream according to the value of the copy control information having a higher priority over the other copy control information. For example, when the first and second copy control information are not identical, for example, have values '10' and '11,' (See Table 1 above) respectively, the copy control information having a higher copy protection value may be used, that is, a higher copy protection value '11' may be used over a lower copy protection value '10' of the other copy control information when the determining unit 420 establishes that the second copy control information has priority over the first copy control information. Table 1 shows an example of the prioritization of copy protection values, ranging from '00', having the lowest copy protection value, to '11', having the highest copy protection value. A higher copy protection value provides enhanced copy protection over a lower copy protection value.

When it is determined by the modification determining unit 420 that the first and second copy control information have the same value or that, for example, the first copy control information has not been modified, the modification determining unit 420 transmits the value of the first copy control information to the control unit 430 and transmits the second copy control information and other information used to generate the decryption key to the decryption key generating unit 440. The other information may comprise at least one of a seed value randomly generated to generate the decryption key, a value of common key or secret key inherent within an AV apparatus, and a value of common key or secret key corresponding to the storage media for AV content. The control unit 430 checks the value of the first copy control information as received. When the value of the first copy control information corresponds to 'copy free,' there is no need to decrypt the AV content of the AV stream, and therefore, the control unit 430 sends a command to the content interpreting unit 450 to transmit the AV content, as received, to an output device 460. When the value of the first copy control information corresponds to 'no more copy or copy never,' 'copy free but encrypted,' or 'copy one generation,' the control unit 430 transmits the first copy control information to the decryption key generating unit 440, thereby authorizing the unit 440 to generate the decryption key. At this time, the decryption key generating unit 440 generates the decryption key by using the second copy control information and the other information received from the modification determining unit 420, and transmits it to the content interpreting unit 450.

The content interpreting unit 450 receives a command from the control unit 430 to execute a decryption of the AV content received from the AV stream receiving unit 410, and decrypts the received AV content by using the decryption key transmitted from the decryption key generating unit 440. The content interpreting unit 450 outputs decrypted AV content to the output device 460. For example, the output device 460 may comprise an electrical or optical recording medium, a storage medium on which the AV stream as read may be recorded, or a displaying apparatus on which the AV stream as read may be displayed. According to other aspects, the content interpreting unit 450 may transmit the decrypted AV content through a wire or a wireless transmission medium in lieu of the output device 460 above.

Figure 5:
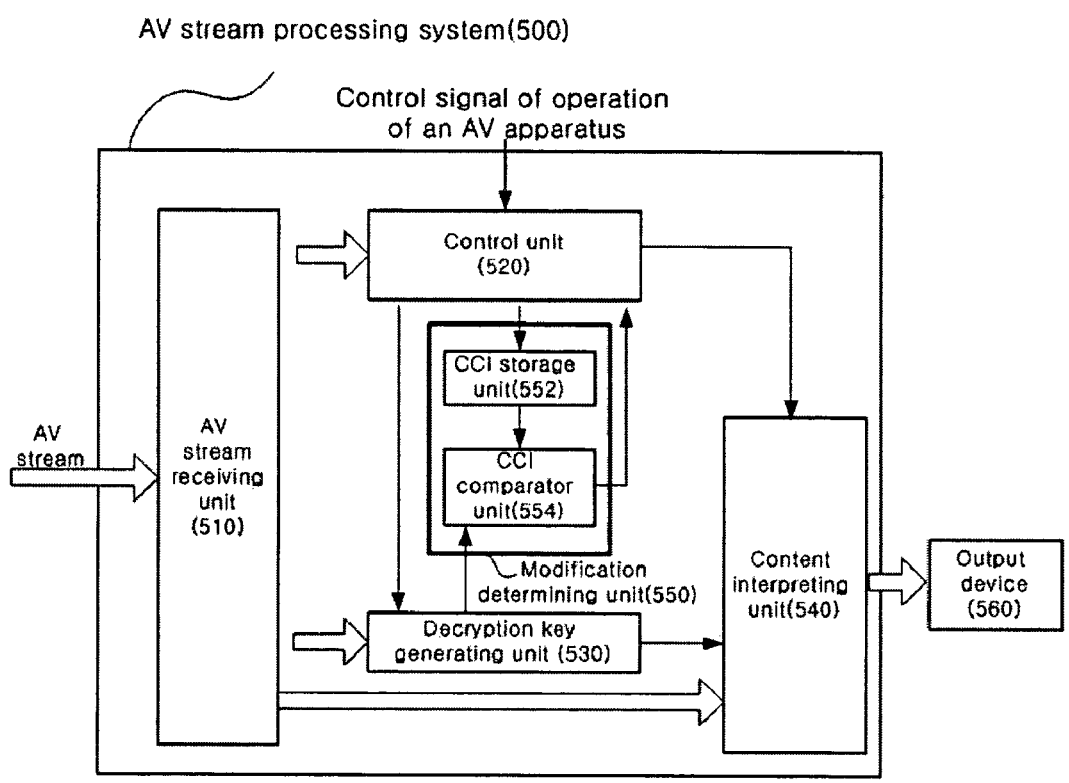
FIG. 5 is a block diagram illustrating an AV stream processing system for data copy protection according to still another embodiment of the present invention.

FIG. 5 shows an AV stream processing system for data copy protection according to still another embodiment of the present invention. The AV stream processing system 500 comprises an AV stream receiving unit 510, a control unit 520, a decryption key generating unit 530, a modification determining unit 550, and a content interpreting unit 540. The modification determining unit 550 comprises a copy control information (CCI) storage unit 552 and a CCI comparator unit 554.

The AV stream receiving unit 510 receives an AV stream and transmits AV contents included in the AV stream to the content interpreting unit 540. The control unit 520 receives first copy control information included in the AV stream transmitted from the AV stream receiving unit 510, transmits a command signal corresponding to the first copy control information to the decryption key generation key 530 and the content interpreting unit 540, and transmits the first copy control information received from the AV stream receiving unit 510 to the CCI storage unit 552. The decryption key generating unit 530 receives second copy control information included in the AV stream, from the AV stream receiving unit 510, and other information used to generate a decryption key, generates the decryption key when an authorization to generate the same is granted from the control unit 520, and transmits the generated decryption key to the content interpreting unit 540. The modification determining unit 550 determines whether the copy control information has been modified. The CCI storage unit 552 receives and stores the first copy control information transmitted from the control unit 520. The CCI comparator unit 554 receives the second copy control information transmitted from the decryption key generating unit 530 and compares a value thereof with a value of the first copy control information in the CCI storage unit 552, so as to determine whether the first copy control information has been modified. The content interpreting unit 540 receives a command to decrypt the AV content of the AV stream from the control unit 520 and a decryption key from the decryption key generating unit 530, and decrypts the AV content received from the AV stream receiving unit 510. The content interpreting unit 540 transmits the decrypted AV content to an output device 560.

An operation of the AV stream processing system 500 will be described in detail. The AV stream receiving unit 510 receives an AV stream and transmits first copy control information included in the AV stream to the control unit 520. The AV stream receiving unit 510 also transmits second copy control information included in the AV stream to the decryption key generating unit 530 and AV contents of the AV stream to the content interpreting unit 540. The control unit 520 receives a control signal to control an operation of an AV apparatus, input from the outside. For example, the control signal may be a signal to allow the AV apparatus to play the AV contents of the AV stream or a signal to copy the AV contents to a predetermined storage space.

When the first copy control information has a value corresponding to 'copy free,' there is no need to decrypt the AV content, and therefore, the control unit 520 sends a command to the content interpreting unit 540 to transmit the as received AV content to an output device 560. When the first copy control information has a value corresponding to 'no more copy or copy never,' 'copy free but encrypted,' or 'copy one generation,' the control unit 520 transmits the first copy control information to the decryption key generating unit 530, thereby authorizing the unit 540 to generate a decryption key. At this time, the decryption key generating unit 530 generates the decryption key by using the second copy control information previously received from the AV stream receiving unit 510 and other information used to generate the decryption key. The decryption key generating unit 530 transmits the generated decryption key to the content interpreting unit 540. Other information may comprise at least one of a seed value randomly generated to generate the decryption key, a value of common key or secret key inherent within an AV apparatus, a value of common key or secret key corresponding to the storage media for AV content, etc.

The CCI comparator unit 554 receives the second copy control information transmitted from the decryption key generating unit 530, compares it with the value of the first copy control information stored in the CCI storage unit 552, determines whether the first copy control information has been modified, and transmits the determination result to the control unit 520. When the value of the first copy control information is different from the value of the second copy control information, it is determined that the first copy control information has been modified. In this case, the control unit 520 transmits a command to suspend decryption of the AV contents to the content interpreting unit 540, and accordingly, the content interpreting unit 540 does not decrypt the AV content already received, and, for example, the AV stream processing system 500 suspends playing of the AV content. According to another aspect, the control unit 520 may transmit a command signal to suspend generation of a decryption key to the decryption key generating unit 530, to thereby stop the decryption key itself from being generated.

According to still another aspect, when the first and second copy control information are different, the modification determining unit 550 establishes a priority between the first and second copy control information. In this case, the control unit 520 determines whether to decrypt the AV stream according to a value of the copy control information having a higher priority over the other copy control information.

When it is determined that the first and second copy control information have the identical value, this determination result is transmitted to the control unit 520. The control unit 520 sends a command to the content interpreting unit 540 to decrypt the AV content of the AV stream already received from the AV stream receiving unit 510. The content interpreting unit 540 receives a command from the control unit 520 to execute decryption of the AV content as already received from the AV stream receiving unit 510, and decrypts the received AV content by using the decryption key transmitted from the decryption key generating unit 530. The content interpreting unit 540 outputs the decrypted AV content to the output device 560. For example, the output device 560 may comprise an electrical or optical recording medium, a storage medium on which an AV stream as read can be recorded, or a displaying apparatus on which the AV stream as read may be displayed. According to other aspects, the content interpreting unit 540 may transmit the decrypted AV content through a wire or a wireless transmission medium in lieu of the output device 560 above.

As described above, according to an aspect of the present invention, the CCI comparator unit 554 of the modification determining unit 550 compares the first copy control information with the second copy control information and transmits the comparison result to the control unit 520, and a command signal corresponding to the comparison result is transmitted to the content interpreting unit 540. According to another aspect, the CCI comparator unit 554 may directly transmit the command to the content interpreting unit 540.

Figure 6:
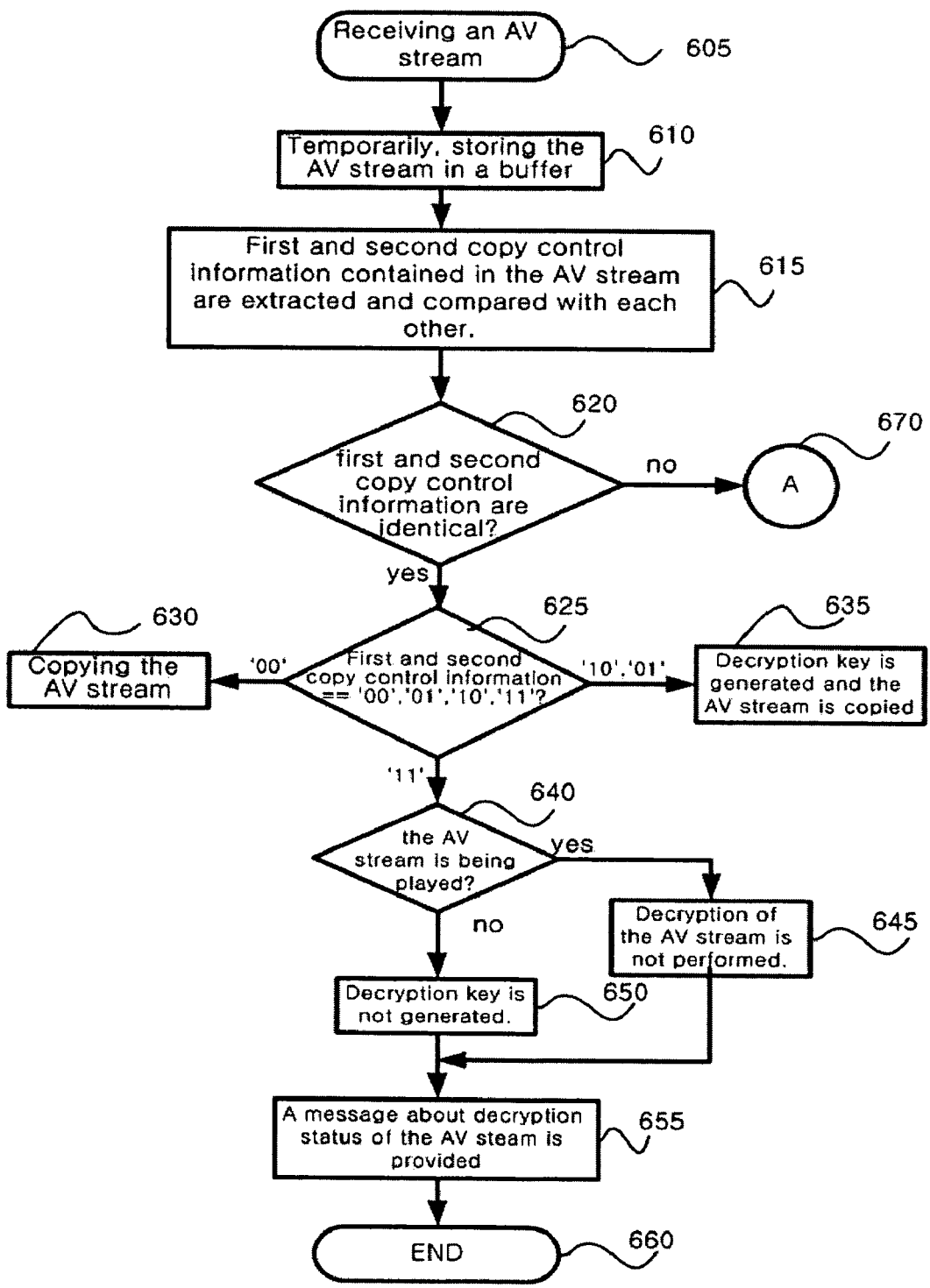
FIG. 6 is a flow chart illustrating a method of processing an AV stream for copy protection according to an embodiment of the present invention.

FIG. 6 shows a flow chart illustrating an AV stream processing method for copy protection according to an embodiment of the present invention. As shown in FIG. 6, an AV stream is input and the input AV stream is temporarily stored in a temporary storage space, in operations 605 and 610, respectively. In operation 615, first copy control information and second copy control information included in the AV stream are extracted and compared with each other. When the first copy control information has a different value from that of the second copy control information (operation 620), the method may proceed to operation 670 to be described in detail with reference to FIGS. 7A and 7B.

When the values of the first and second copy control information are of the same (operation 620), a corresponding process is executed in operation 625. For example, when the values of the first and second copy control information are 'copy free,' that is, '00,' there is no need to decrypt the AV contents of the AV stream. Thus, the AV stream is directly copied in operation 630. When the values of the first and second copy control information are 'copy free but encrypted,' or 'copy one generation,' that is, '01' or '10,' a decryption key is generated so as to decrypt the AV stream in operation 635. When the values of the first and second copy control information are 'no more copy or copy never,' that is, '11,' it is checked whether the AV stream is currently being played in operation 640. When the AV stream is being played, decryption of the AV stream for copying the AV contents is not performed, in operation 645. When the AV stream is not being played, the decryption key for decryption of the contents is not generated, in operation 650. In operation 655, a message indicating that the AV stream cannot be decrypted because copying thereof is prohibited, is provided through a displaying means known in the art (not shown) and the processing ends at operation 660.

Figure 7A:
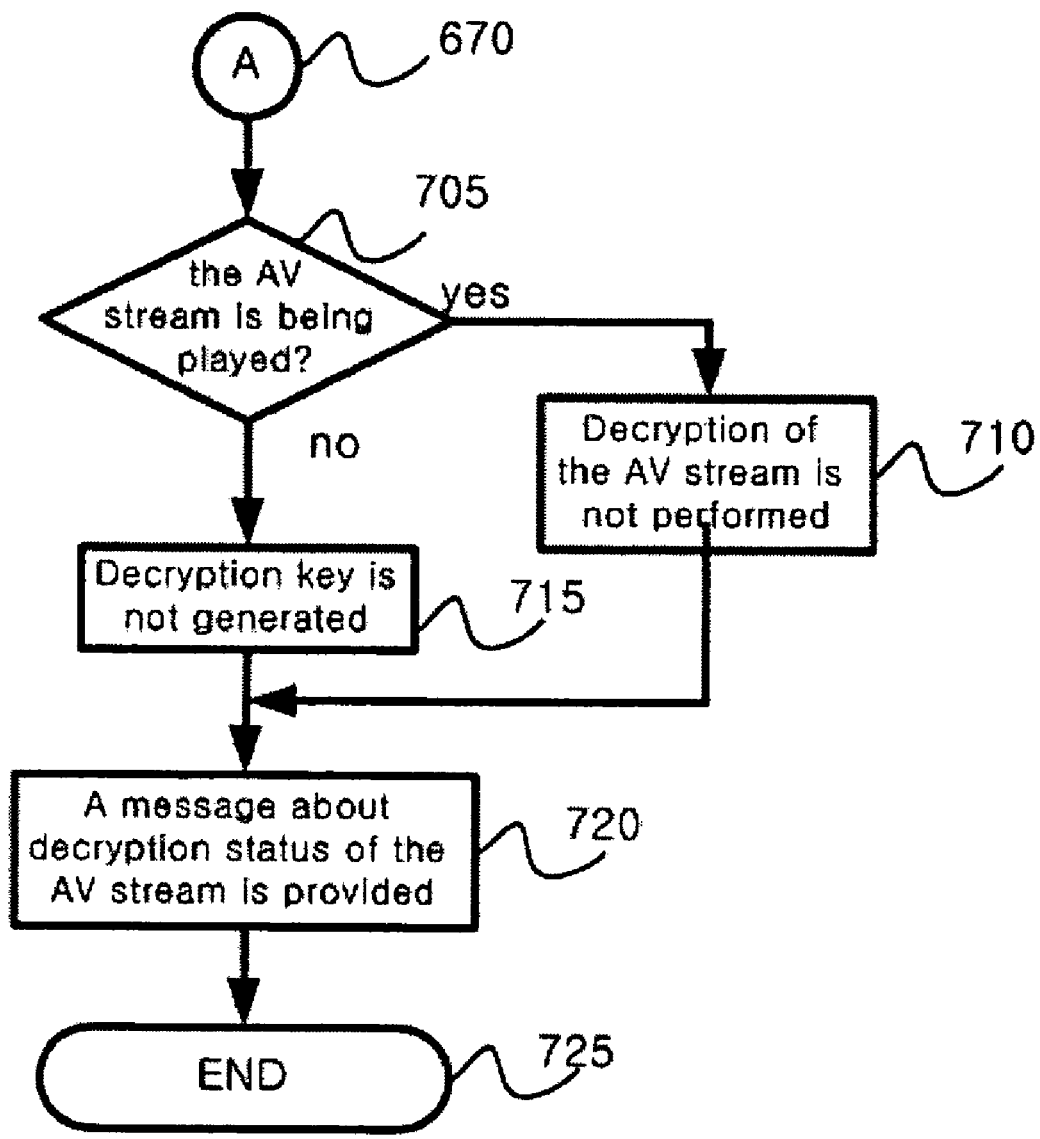
FIGS. 7A and 7B are flow charts illustrating AV stream data copy control methods according to other embodiments of the present invention, when first copy control information and second copy control information are not identical.
Figure 7B:
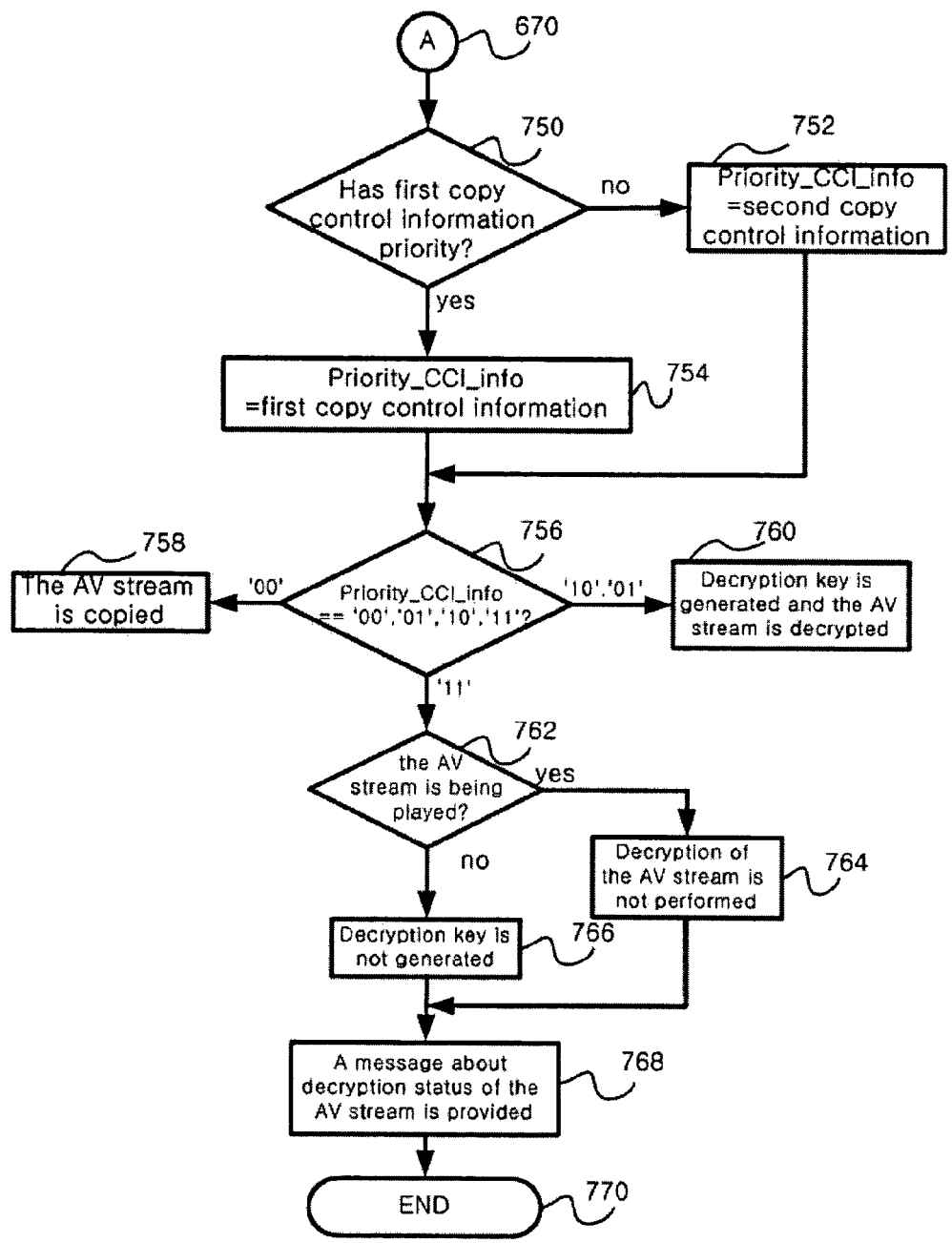

FIGS. 7A and 7B are flow charts illustrating AV stream data copy control methods according to other embodiments of the present invention, when first copy control information and second copy control information are not identical. FIG. 7A illustrates that decryption of AV contents is not performed, unconditionally, and FIG. 7B illustrates that decryption of an AV stream is determined based on a value of copy control information having a higher priority by establishing a priority between the first copy control information and the second copy control information.

Referring to FIG. 7A, when values of the first and second copy control information are not the same, it is checked whether the AV stream subject to copying is being played in operation 705. When the AV stream is being played, this means that a decryption key has already been generated, and thus, a decryption process using the decryption key is not performed, in operation 710. When the AV stream is not being played, the decryption key is not generated, in operation 715. In operation 720, a message indicating that the AV stream cannot be decrypted because copying thereof is prohibited, is provided through a displaying means known in the art (not shown) and the method ends at operation 725.

Referring to FIG. 7B, when the values of the first and second copy control information are not identical, it is checked as to which copy control information is established to have a higher priority value, and the copy control information having the higher priority value is set to 'Priority_CCI_info.' According to an aspect, it is checked whether the first copy control information has priority in operation 750, and if so, the first copy control information is set to 'Priority_CCI_info' in operation 754, and if not, the second copy control information is set to 'Priority_CCI_info' in operation 752.

When a value of the 'Priority_CCI_info' is '00,' (operation 756) that is, 'copy free,' an AV stream is not encrypted and free copying thereof is allowed. In this case, since there is no need to decrypt the AV content of the AV stream, the AV stream is directly copied in operation 758. When the value of the 'Priority_CCI_info' is '01' or '10,' (operation 756) that is, 'copy free but encrypted' or 'copy one generation,' a decryption key is generated to decrypt the AV stream in operation 760. At this time, the value of '10' means that only one time copying is available and copying of the contents is prohibited thereafter, and therefore, the value of the concerned copy control information is changed to '11' after the copying. When the value of 'Priority_CCI_info' is '11,' (operation 756) that is, 'no more copy or copy never,' decryption of the AV content is absolutely prohibited. In this case, it is checked whether the AV stream is currently being played in operation 762. Were the AV stream being played, this may mean that the decryption key has already been generated, and thus, a decryption process using the decryption key is not performed, in operation 764. When the AV stream is not being played, the decryption key is not generated, in operation 766. In operation 768, a message indicating that the AV stream cannot be decrypted because copying thereof is prohibited is provided through a displaying means known in the art (not shown) and the method ends at operation 770.

Means and methods for unauthorized copy protection of contents according to the present invention, as described above, and obvious from the description provided above, may be applied to a variety of systems and apparatuses which may be implemented by hardware and/or software, including digital and electronic household appliances and other electronic goods used to store and/or play an AV stream which may or may not have copy control information. It is understood that the AV stream may refer to data for audio and/or video recording, and unauthorized processing may refer to unauthorized accessing, displaying, copying, or a combination thereof.

It is also understood that a system which uses the present invention also includes permanent or removable storage, such as magnetic and optical discs, RAM, ROM, a carrier wave medium, etc., on which the process and data structures of the present invention can be stored and distributed. The operations can also be distributed via, for example, downloading over a network such as the Internet.

It is further understood that while illustrative, non-limiting embodiments of the present invention overcome the above disadvantages and other disadvantages not described above, the present invention is not required to overcome the disadvantages described above, and illustrative, non-limiting embodiments of the present invention may not overcome any of the problems described above.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. An audio/video (AV) stream processing system comprising:
   a receiving unit which receives an AV stream comprising a content information field and a content field, the content information field comprising first copy control information, and the content field comprising second copy control information;
   a determination unit which determines whether the first and the second copy control information are different; and
   a decryption unit which processes the AV stream according to at least one of the first and second copy control information when the first and the second copy control information are the same.

2. The system according to claim 1, wherein the decryption unit stops processing the AV stream when the first and the second copy control information are different.

3. The system according to claim 1, wherein:
   each of the first and the second copy control information comprises a copy control mode of a content of the AV stream, and
   the copy control mode comprises one of a first mode in which the content is encrypted and copying of the content is prohibited, a second mode in which the content is encrypted and a one time copying of the content is allowed, the second mode being changed to the first mode after the one time copying, a third mode in which the content is encrypted and unrestricted copying of the content is allowed, and a fourth mode in which the content is not encrypted and unrestricted copying of the content is allowed.

4. The system as claimed in claim 3, wherein the decryption unit comprises:
   a key generating unit which generates a decryption key for decrypting the content;
   a content interpreting unit which decrypts the content using the decryption key to generate a decrypted content; and
   a control unit which controls the key generating unit and the content interpreting unit to stop generating the decryption key or stop decrypting the content, when the first and the second copy control information are different, and, when the first and the second copy control information are the same, controls the key generating unit and the content interpreting unit according to the copy control mode.

5. The system as claimed in claim 4, further comprising a storage unit which stores the decrypted content or the content.

6. The system according to claim 4, wherein the key generating unit generates the decryption key using information comprising the second copy control information.

7. The system according to claim 3, wherein the determining unit comprises:
- a storage unit which stores the first copy control information; and
- a comparator unit which compares the copy control mode of the first copy control information with the copy control mode of the second copy control information.

8. The system as claimed in claim 3, wherein the decryption unit comprises:
- a key generating unit which generates a decryption key;
- a content interpreting unit which decrypts the content; and
- a control unit which outputs a control signal corresponding to the copy control mode when the first and the second copy control information are the same, and generates a stop signal when the first and the second copy control information are different or the control signal corresponds to the first mode, wherein the control unit outputs the stop signal to the key generating unit when the AV stream is not being played and outputs the stop signal to the content interpreting unit when the AV stream is being played, wherein the key generating unit generates a decryption key for decrypting the content in response to the control signal corresponding to one of the second and third mode, and stops generating the decryption key in response to the stop signal; and the content interpreting unit which decrypts the content using the decryption key, outputs the content, in response to the control signal corresponding to the fourth mode, and stops decrypting the content in response to the stop signal.

9. An audio/video (AV) stream processing method comprising:
- receiving an AV stream comprising a content information field and a content field, wherein the content information field comprises first copy control information, and the content field comprises second copy control information;
- determining whether the first and the second copy control information are different, in a determination; and
- processing the AV stream based on the determination.

10. The method according to claim 9, wherein the processing the AV stream comprises processing the AV stream according to copy control mode information when the first and the second copy control information are the same.

11. The method according to claim 9, wherein the processing the AV stream further comprises terminating a decrypting of a content of the AV stream when the first and the second copy control information are different.

12. The method according to claim 9, wherein, when the first and the second copy control information are different, the processing the AV stream comprises terminating a decrypting of a content of the AV stream when the AV stream is being played, or terminating a generating of a decryption key for decrypting the content of the AV stream when the AV stream is not being played.

13. An audio/video (AV) stream processing method comprising:
- receiving an AV stream comprising a content information field and a content field, wherein the content information field comprises first copy control information, and the content field comprises second copy control information;
- first determining whether the first and the second copy control information are different, in a determination;
- second determining whether the AV stream is to be processed based on the determination; and
- displaying a message indicating that processing the AV stream is prohibited when the first and the second copy control information are different.

14. A method for copy control in processing an audio/video (AV) stream, the method comprising:
- extracting copy control information from a content information field of the AV stream;
- determining whether the control information has been modified; and
- processing the AV stream based on the determination, wherein the determining comprises determining whether the copy control information of the content information field has been modified when compared to copy control information of a content field of the AV stream, to prevent an unauthorized processing of the AV stream.

* * * * *